United States Patent
Bergweiler et al.

(10) Patent No.: US 12,240,538 B2
(45) Date of Patent: Mar. 4, 2025

(54) LIMITING A CONTROL VARIABLE FOR A MOTOR OF AN ELECTRIC POWER STEERING SYSTEM

(71) Applicant: Bayerische Motoren Werke Aktiengesellschaft, Munich (DE)

(72) Inventors: Tobias Bergweiler, Munich (DE); Martin Hell, Dachau (DE); Peter Korti, Wolfratshausen (DE); Gareth McKevitt, Munich (DE); Andreas Sauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 663 days.

(21) Appl. No.: 17/594,372

(22) PCT Filed: Mar. 12, 2020

(86) PCT No.: PCT/EP2020/056579
§ 371 (c)(1),
(2) Date: Oct. 13, 2021

(87) PCT Pub. No.: WO2020/216523
PCT Pub. Date: Oct. 29, 2020

(65) Prior Publication Data
US 2022/0177026 A1 Jun. 9, 2022

(30) Foreign Application Priority Data
Apr. 25, 2019 (DE) ..................... 10 2019 110 703.2

(51) Int. Cl.
*B62D 5/00* (2006.01)
*B62D 5/04* (2006.01)

(52) U.S. Cl.
CPC ......... *B62D 5/0463* (2013.01); *B62D 5/0481* (2013.01)

(58) Field of Classification Search
CPC ........................... B62D 5/0463; B62D 5/0481
See application file for complete search history.

(56) References Cited

U.S. PATENT DOCUMENTS

| | | | |
|---|---|---|---|
| 9,031,747 B2 | 5/2015 | Benyo et al. | |
| 2013/0211676 A1* | 8/2013 | Benyo | B62D 15/025 701/42 |

(Continued)

FOREIGN PATENT DOCUMENTS

| | | |
|---|---|---|
| CN | 105564501 A | 5/2016 |
| DE | 10 2008 038 891 A1 | 2/2010 |

(Continued)

OTHER PUBLICATIONS

Chinese-language Office Action issued in Chinese Application No. 202080024602.4 dated Feb. 17, 2023 with English translation (14 pages).

(Continued)

*Primary Examiner* — Aryan E Weisenfeld
*Assistant Examiner* — Jeffrey R Chalhoub
(74) *Attorney, Agent, or Firm* — Crowell & Moring LLP

(57) ABSTRACT

A method limits a control variable for a motor of an electric power steering system for a motor vehicle having automated lateral control. The method receives a setpoint steering angle, determines the control variable in accordance with the setpoint steering angle, receives an actual steering angle, determines a virtual torsion-bar torque in accordance with the setpoint steering angle and the actual steering angle, determines at least one limit value for the control variable in accordance with the virtual torsion-bar torque, and limits the control variable in accordance with the at least one limit value.

7 Claims, 1 Drawing Sheet

(56) References Cited

U.S. PATENT DOCUMENTS

| | | | |
|---|---|---|---|
| 2014/0277945 A1 | 9/2014 | Chandy | |
| 2015/0259007 A1 | 9/2015 | Di Cairano et al. | |
| 2016/0121923 A1* | 5/2016 | Maeda | B62D 5/0481 |
| | | | 701/41 |
| 2016/0176440 A1* | 6/2016 | Witte | G05D 1/0061 |
| | | | 701/23 |
| 2018/0346021 A1* | 12/2018 | Wang | B62D 5/0463 |
| 2019/0023319 A1 | 1/2019 | Tyrrell et al. | |
| 2020/0039577 A1 | 2/2020 | Kataoka | |

FOREIGN PATENT DOCUMENTS

| | | |
|---|---|---|
| DE | 10 2013 011 283 A1 | 1/2015 |
| DE | 10 2015 204 332 A1 | 9/2015 |
| GB | 2549328 A | 10/2017 |
| JP | 2013-199256 A | 10/2013 |
| JP | 2017-202774 A | 11/2017 |
| JP | 2018-12473 A | 1/2018 |
| JP | 2018-39419 A | 3/2018 |
| JP | 2018-177026 A | 11/2018 |

OTHER PUBLICATIONS

International Search Report (PCT/ISA/210) issued in PCT Application No. PCT/EP2020/056579 dated Jun. 18, 2020 with English translation (five (5) pages).

German-language Written Opinion (PCT/ISA/237) issued in PCT Application No. PCT/EP2020/056579 dated Jun. 18, 2020 (five (5) pages).

German-language Search Report issued in German Application No. 10 2019 110 703.2 dated Dec. 6, 2019 with partial English translation (11 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

Japanese-language Office Action issued in Japanese Application No. 2021-559294 dated Oct. 4, 2023 with English translation (7 pages).

\* cited by examiner

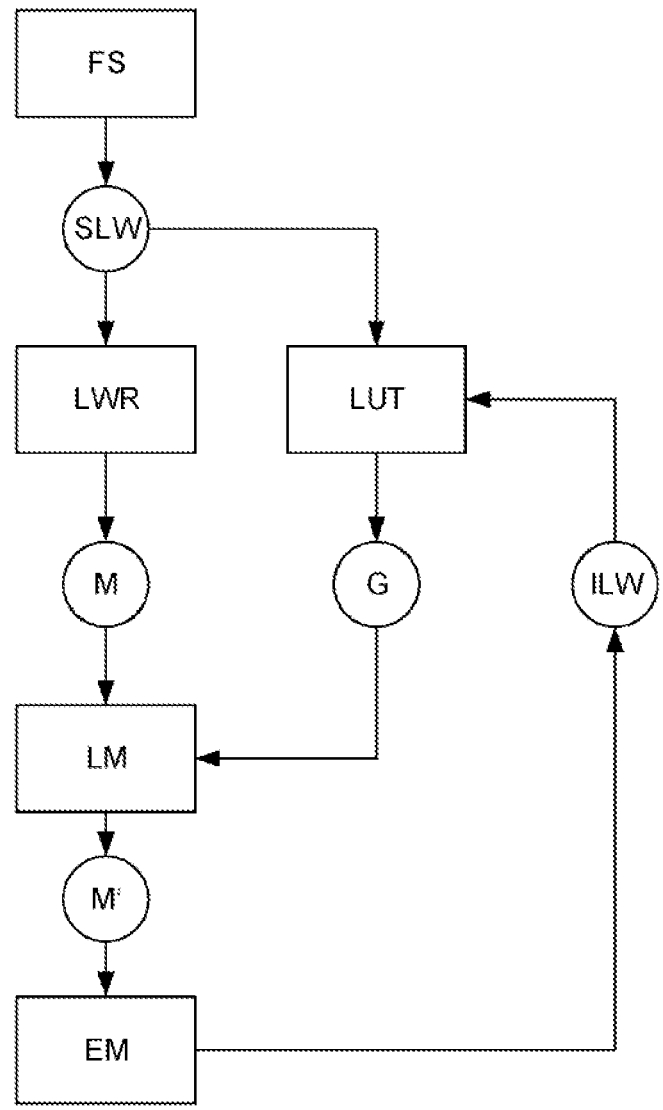

LIMITING A CONTROL VARIABLE FOR A MOTOR OF AN ELECTRIC POWER STEERING SYSTEM

BACKGROUND AND SUMMARY OF THE INVENTION

The invention relates to a method and a control device for limiting a control variable for a motor of an electric power steering system.

The term "automated driving" can be understood in the context of the document as meaning driving with automated longitudinal or transverse guidance or autonomous driving with automated longitudinal and transverse guidance. The term "automated driving" comprises automated driving with any desired level of automation. Levels of automation by way of example are assisted, partially automated, highly automated or fully automated driving. These levels of automation have been defined by the Bundesanstalt für Straßenwesen (BASt) [German Federal Highway Research Institute] (see BASt publication "Forschung kompakt" [research compact], November 2012 edition). In the case of assisted driving, the driver performs the longitudinal or transverse guidance the whole time, while the system takes over the other function, respectively, within certain limits. In the case of partially automated driving (PAD), the system takes over the longitudinal and transverse guidance for a certain time period and/or in specific situations, while the driver must monitor the system the whole time in the same way as in the case of assisted driving. In the case of highly automated driving (HAD), the system takes over the longitudinal and transverse guidance for a certain time period without the driver having to monitor the system the whole time; however, in a certain time the driver must be able to take over the vehicle guidance. In the case of fully automated driving (FAD), for a specific application the system can automatically handle driving in all situations; for this application, the driver is no longer required. The aforementioned four levels of automation according to the BASt definition correspond to SAE levels 1 to 4 of the standard SAE J3016 (SAE—Society of Automotive Engineering). For example, highly automated driving (HAD) as defined by the BASt corresponds to level 3 of the standard SAE J3016. Furthermore, in SAE J3016, SAE level 5 is still provided as the highest level of automation, which is not included in the BASt definition. SAE level 5 corresponds to driverless driving, in which the system can automatically handle all situations during the entire journey in the same way as a human driver; a driver is generally no longer required.

Electric power steering systems for motor vehicles are known. They reduce the force necessary for actuating a steering wheel of a motor vehicle, in that the force applied by the driver for steering is boosted by an electric motor.

To prevent hazardous situations due to an incorrectly determined torque of the electric motor, in the case of conventional electric power steering systems the determined torque of the electric motor is limited by a limiter. This limitation takes place in this case in accordance with the torsion-bar torque or manual torque applied by the driver of the motor vehicle to the steering wheel.

This conventional limitation is not possible however in the case of automated driving with at least automated transverse guidance, since in this case the driver of the motor vehicle specifically does not apply a torsion-bar torque to the steering wheel of the motor vehicle.

The object of the invention is to prevent hazardous situations in the case of automated driving with at least automated transverse guidance due to an incorrectly determined torque of the electric motor of the electric power steering system.

The object is achieved by the features of the independent patent claims. Advantageous embodiments are described in the dependent claims. It is pointed out that additional features of a patent claim dependent on an independent patent claim can form an invention without the features of the independent patent claim, or just in combination with some of the features of the independent patent claim, which stands on its own and is independent of the combination of all features of the independent patent claim and which can be made the subject of an independent claim, a divisional application or a subsequent application. This applies in the same way to technical teachings described in the description, which can form an invention that is independent of the features of the independent patent claims.

A first aspect of the invention relates to a method for limiting a control variable for a motor of an electric power steering system for a motor vehicle with automated transverse guidance.

In the case of an electric power steering system, a program-controlled electric servomotor on the steering mechanism (steering column or steering gear) assists and overlays the driver's steering movements.

One step of the method is that of receiving a setpoint steering angle, in particular from a driving system for automated driving with at least automated transverse guidance and in particular not from a steering wheel of the motor vehicle.

A further step of the method is that of determining the control variable in accordance with the setpoint steering angle.

The control variable is in particular a setpoint torque for the motor or a manual torque as an input signal for a steering angle controller, which determines a setpoint torque for the motor from the manual torque.

A further step of the method is that of receiving an actual steering angle, for example from the motor of the electric power steering system or from a separate steering angle sensor.

A further step of the method is that of determining a virtual torsion-bar torque in accordance with the setpoint steering angle and the actual steering angle.

In particular, the determining of the virtual torsion-bar torque in accordance with the setpoint steering angle and the actual steering angle is performed by means of a lookup table, that is to say a conversion table.

A further step of the method is that of determining at least one limiting value for the control variable in accordance with the virtual torsion-bar torque, for example likewise by means of a lookup table A further step of the method is that of limiting the control variable in accordance with the at least one limiting value.

The limiting may be performed in such a way that the control variable is passed on unchanged if the control variable lies below the limiting value. If the control variable lies above the limiting value, instead the limiting value may be passed on.

In an advantageous embodiment, the determining of at least one limiting value for the control variable in accordance with the virtual torsion-bar torque comprises the following steps:

determining an upper limiting value for the control variable in accordance with the virtual torsion-bar torque, and determining a lower limiting value for the control variable in accordance with the virtual torsion-bar torque.

In a further advantageous embodiment, a first upper limiting value and a first lower limiting value are determined for a first control variable.

A second upper limiting value and a second lower limiting value are determined for a second control variable in such a way that the distance between the second upper limiting value and the second lower limiting value corresponds essentially to the distance between the first upper limiting value and the first lower limiting value.

In particular, the second control variable follows the first control variable in time. The respective upper limiting value and the respective lower limiting value predefine an interval for the control variable. The fact that the distance between the second upper limiting value and the second lower limiting value corresponds essentially to the distance between the first upper limiting value and the first lower limiting value means that this interval is essentially only displaced.

In a further advantageous embodiment, a first limiting value is determined for a first virtual torsion-bar torque.

A second limiting value, which is greater than the first limiting value, is determined for a second virtual torsion-bar torque, which is greater than the first virtual torsion-bar torque.

There is consequently an essentially linear relationship between the virtual torsion-bar torque and the limiting value.

A second aspect of the invention relates to a control device for limiting a control variable for a motor of an electric power steering system for a motor vehicle with automated transverse guidance.

The control device is set up to receive a setpoint steering angle, to determine the control variable in accordance with the setpoint steering angle, to receive an actual steering angle, to determine a virtual torsion-bar torque in accordance with the setpoint steering angle and the actual steering angle, to determine at least one limiting value for the control variable in accordance with the virtual torsion-bar torque, and to limit the control variable in accordance with the at least one limiting value.

The statements made above concerning the method according to the invention in relation to the first aspect of the invention also apply in a corresponding way to the device according to the invention in relation to the second aspect of the invention; advantageous exemplary embodiments of the device according to the invention correspond to the described advantageous exemplary embodiments of the method according to the invention. Advantageous exemplary embodiments of the vehicle according to the invention that are not explicitly described at this point correspond to the described advantageous exemplary embodiments of the method according to the invention.

The invention is described below on the basis of an exemplary embodiment with the aid of the appended drawing.

BRIEF DESCRIPTION OF THE DRAWING

The single FIG. 1 shows a method for limiting a control variable M, M' for a motor EM of an electric power steering system for a motor vehicle with automated transverse guidance.

DETAILED DESCRIPTION OF THE DRAWING

Referring to FIG. 1, a method is shown for limiting a control variable M, M' for a motor EM of an electric power steering system for a motor vehicle with automated transverse guidance. The control variable is in this case, for example, a setpoint torque for the motor EM.

One step in this case is that of receiving a setpoint steering angle SLW, for example from a driving system FS for automated driving with at least automated transverse guidance.

A further step is that of determining the control variable M in accordance with the setpoint steering angle SLW. This step may be performed for example by means of a steering angle controller LWR.

A further step is that of receiving an actual steering angle ILW, for example from the motor EM of the electric power steering system.

A further step is that of determining a virtual torsion-bar torque in accordance with the setpoint steering angle SLW and the actual steering angle ILW, wherein the determining of the virtual torsion-bar torque is performed in accordance with the setpoint steering angle SLW and the actual steering angle ILW by means of a lookup table LUT.

A further step is that of determining at least one limiting value G for the control variable M, M' in accordance with the virtual torsion-bar torque.

In particular, the determining of at least one limiting value G for the control variable M, M' in accordance with the virtual torsion-bar torque comprises determining an upper limiting value for the control variable M, M' in accordance with the virtual torsion-bar torque, and determining a lower limiting value for the control variable M, M' in accordance with the virtual torsion-bar torque.

For example, in this case a first upper limiting value and a first lower limiting value are determined for a first control variable M, M', and a second upper limiting value and a second lower limiting value are determined for a second control variable M, M' in such a way that the distance between the second upper limiting value and the second lower limiting value corresponds essentially to the distance between the first upper limiting value and the first lower limiting value.

In particular, for a first and a second virtual torsion-bar torque, which follow one another in time, a first limiting value is determined for the first virtual torsion-bar torque, and a second limiting value, which is greater than the first limiting value, is determined for the second virtual torsion-bar torque, which is greater than the first virtual torsion-bar torque.

A further step of the method is that of limiting the control variable M, M' in accordance with the at least one limiting value G.

The limiting may be performed for example by means of a limiter LM in such a way that the control variable M is passed on unchanged as the control variable M' if the control variable M lies below the limiting value G. If the control variable M lies above the limiting value G, instead the limiting value G may be passed on as the control variable M'.

What is claimed is:

1. A method for limiting a control variable for a motor of an electric power steering system for a motor vehicle with automated transverse guidance, the method comprising the steps of:
   receiving a setpoint steering angle;
   determining the control variable in accordance with the setpoint steering angle;
   receiving an actual steering angle;

determining a virtual torsion-bar torque in accordance with the setpoint steering angle and the actual steering angle;

determining at least one limiting value for the control variable in accordance with the virtual torsion-bar torque; and limiting operation of the motor based on the control variable in accordance with the at least one limiting value;

wherein the determining of the at least one limiting value for the control variable in accordance with the virtual torsion-bar torque comprises the steps of:

determining an upper limiting value for the control variable in accordance with the virtual torsion-bar torque; and determining a lower limiting value for the control variable in accordance with the virtual torsion-bar torque;

wherein a first upper limiting value and a first lower limiting value are determined for a first control variable; and wherein a second upper limiting value and a second lower limiting value are determined for a second control variable such that the distance between the second upper limiting value and the second lower limiting value corresponds to the distance between the first upper limiting value and the first lower limiting value.

2. The method according to claim 1, wherein the control variable is a setpoint torque for the motor.

3. The method according to claim 1, wherein the control variable is a manual torque.

4. The method according to claim 1, wherein
the determining of a virtual torsion-bar torque in accordance with the setpoint steering angle and the actual steering angle is performed via a lookup table.

5. The method according to claim 1, wherein
a first limiting value is determined for a first virtual torsion-bar torque, and
a second limiting value, which is greater than the first limiting value, is determined for a second virtual torsion-bar torque, which is greater than the first virtual torsion-bar torque.

6. The method according to claim 1, wherein
the setpoint steering angle is received from a driving system for automated driving with at least automated transverse guidance.

7. An apparatus for limiting a control variable for a motor of an electric power steering system for a motor vehicle with automated transverse guidance, comprising:

a control unit configured so as to:

receive a setpoint steering angle, determine the control variable in accordance with the setpoint steering angle, receive an actual steering angle, determine a virtual torsion-bar torque in accordance with the setpoint steering angle and the actual steering angle, determine at least one limiting value for the control variable in accordance with the virtual torsion-bar torque, and limit operation of the motor based on the control variable in accordance with the at least one limiting value;

wherein the determining of the at least one limiting value for the control variable in accordance with the virtual torsion-bar torque comprises the steps of:

determining an upper limiting value for the control variable in accordance with the virtual torsion-bar torque; and determining a lower limiting value for the control variable in accordance with the virtual torsion-bar torque;

wherein a first upper limiting value and a first lower limiting value are determined for a first control variable; and wherein a second upper limiting value and a second lower limiting value are determined for a second control variable such that the distance between the second upper limiting value and the second lower limiting value corresponds to the distance between the first upper limiting value and the first lower limiting value.

\* \* \* \* \*